United States Patent [19]
Rizvi et al.

[11] Patent Number: 5,120,559
[45] Date of Patent: Jun. 9, 1992

[54] EXTRUSION PROCESSING WITH SUPERCRITICAL FLUIDS

[75] Inventors: Syed S. H. Rizvi; Steven Mulvaney, both of Ithaca, N.Y.

[73] Assignee: Cornell Research Foundation, Inc., Ithaca, N.Y.

[21] Appl. No.: 770,345

[22] Filed: Oct. 3, 1991

[51] Int. Cl.$^5$ .............................. A21D 8/00; A23P 1/00
[52] U.S. Cl. ..................................... 426/446; 99/470; 425/203; 425/204; 426/448; 426/449; 426/510; 426/549
[58] Field of Search ............... 426/446, 448, 449, 549, 426/510; 99/470; 425/203, 204, 208; 264/101, 211.23, 349; 366/105; 159/2.2, 2.3

[56] References Cited

U.S. PATENT DOCUMENTS

| | | | |
|---|---|---|---|
| 3,041,176 | 6/1962 | Baker | 426/498 |
| 4,218,480 | 8/1980 | Dyson et al. | 426/549 |
| 4,418,088 | 11/1983 | Cantenot | 426/448 |
| 4,438,146 | 3/1984 | Colby et al. | 426/498 |
| 4,568,550 | 2/1986 | Fulger et al. | 426/448 |
| 4,786,514 | 11/1988 | Wiedmann | 426/449 |
| 4,846,054 | 7/1989 | Mange et al. | 99/470 |

*Primary Examiner*—George Yeung
*Attorney, Agent, or Firm*—Jones, Tullar & Cooper

[57] ABSTRACT

A supercritical fluid such as $CO_2$ is injected under pressure into a fully cooked dough in an extruder. The dough is prepared and after being preconditioning with water and steam, is supplied to an extruder/cooker where it is subjected to high cooking temperatures, which may be on the order of 120° C. The cooked dough is conveyed through an optional steam vent section and is cooled to a temperature of usually less than 100° C. to prevent puffing of the extruded product by the conversion of water to steam. Supercritical $CO_2$ is injected into the cooked and cooled dough, and under the pressure conditions existing in the extruder, the $CO_2$ dissolves into the water phase of the dough. Since the conditions within the extruder are either subcritical or near-critical, various flavors, colorants, or other materials soluble in and carried by the supercritical $CO_2$ are deposited and mixed into the dough before exiting the extruder. The dissolved $CO_2$ then expands the product after exiting the die at the outlet of the extruder, resulting in a product with many regularly-shaped, unconnected pores and a smooth outer skin. Part of the injected $CO_2$ can be vented off before the die to control the expansion of the extrudate.

23 Claims, 1 Drawing Sheet

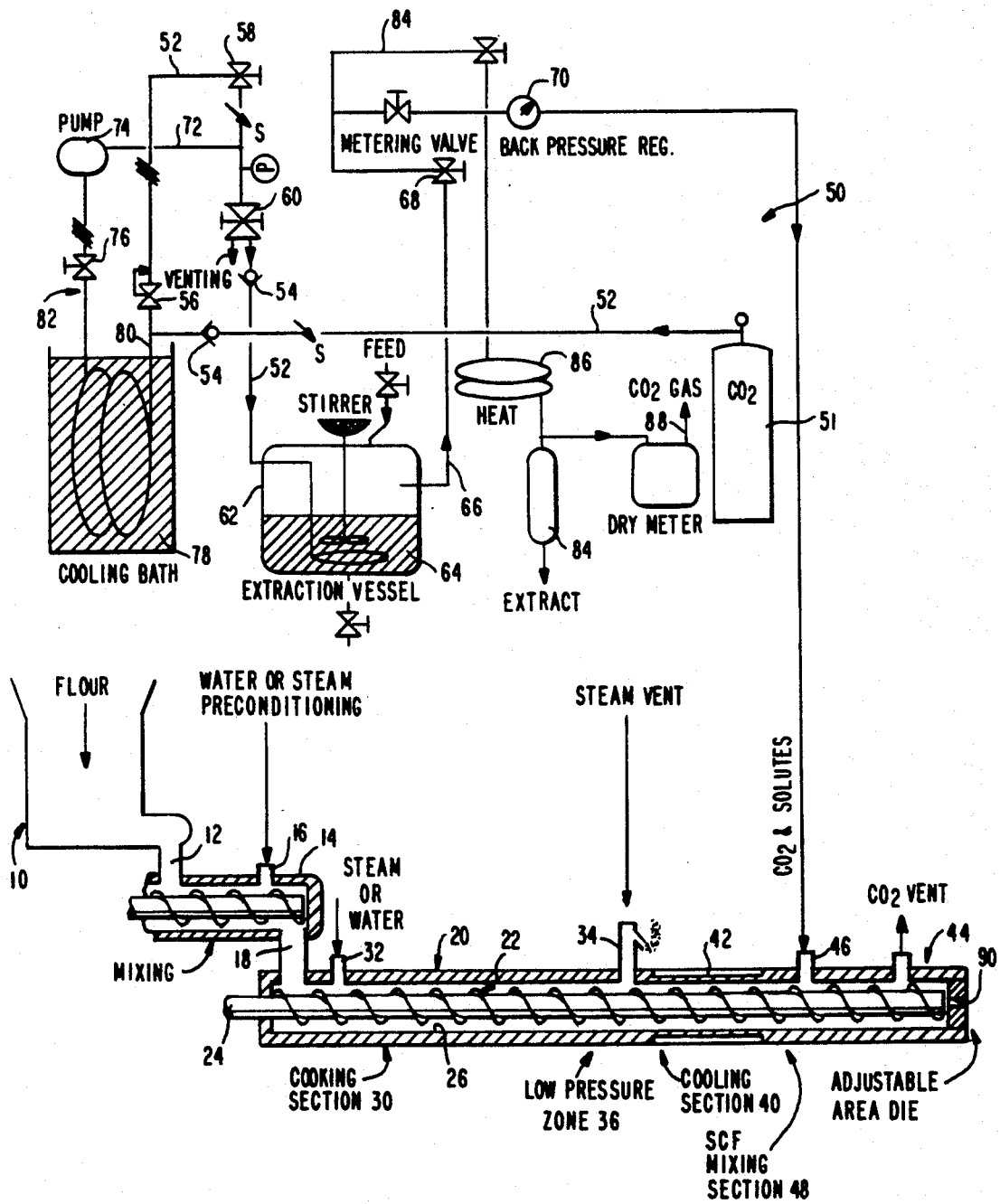

EXTRUSION PROCESSING WITH SUPERCRITICAL FLUIDS

BACKGROUND OF THE INVENTION

The present invention is directed, in general, to a method for extruding food products, and more particularly is directed to such a method which utilizes a supercritical fluid such as carbon dioxide to simultaneously expand, flavor and reduce the viscosity of the food product, and to the apparatus for carrying out the method.

Extrusion cooking of foods is a well known process which is practiced on large commercial scales in countries throughout the world. Extrusion cooking generally involves the mixing of food products in an extruder under conditions of high temperature, high pressure and high shear, with the cooked product being extruded through an exit die. Often, the extruded food product is expanded, or puffed, by the release of steam after the product exits the die. However, in such prior procedures, the degree of puffing is dependent on a severe cooking process, which increases the barrel wear in the extruder, drastically increases the starch solubility of the extrudate, and limits the use of heat sensitive or shear sensitive ingredients, such as flavors or proteins, so that such ingredients must be added to the food product after the extrusion and cooking process, as by spraying the material onto the surface of the extrudate. Generally, in such prior processes, the extrudate has an appreciable moisture content to enable the product to flow through the extruder. This means that a part of the throughput of the extruder is water, and even though much of the water will flash off so as to expand the product at the outlet of the die, nevertheless the high moisture content requires a drying step in many cases. Furthermore, since the moisture content affects both the expansion of the product and its cell structure and texture, it is difficult to specify both expansion and texture independently in conventional processes.

SUMMARY OF THE INVENTION

The present invention involves a process of producing a food product wherein a supercritical fluid (SCF) is introduced into a cooking extruder under conditions which are effective to produce a product having an improved texture, appearance, and flavor. In accordance with the invention, a conventional cooking extruder is modified to extend beyond the cooking and cooling sections to provide a section for injection, mixing and selective removal of a supercritical fluid. Such a fluid may be, for example, carbon dioxide ($CO_2$) at a pressure of about 72.9 atmospheres (1072 psi) psi and at a temperature of about 31° C. At this temperature and pressure, $CO_2$ is at its critical point, and has properties of both a liquid and a gas. If the pressure is further increased, the $CO_2$ changes to a denser fluid and has numerous desirable qualities which result in an improved extrusion process.

The first section of the extruder functions as a typical cooker, whereby the product (e.g. cereal flour) is heated as by the injection of steam, and, if necessary, is gelatinized. If the product temperature is too high, a vent is provided on the extruder to release some steam to lower the temperature. Following the cooker is a cooling section, which may include a cooling jacket to bring the temperature of the product down to a desired level. Thereafter, the supercritical fluid is injected into the product stream in the extruder. This fluid preferably is loaded with soluble materials such as flavoring, coloring, nutrients, etc. which are to be added to the product and the supercritical fluid and the included solutes are injected into the product stream at a selected location in the extruder. The product may have a temperature in the range of 85° to 95° C., for example, in the region of injection of the supercritical fluid, and since this temperature is higher than that of the SCF, it causes a reduction in the fluid density, with the result that the solute material carried by the fluid is released into the product in the extruder. The product is then carried through a mixing section in the extruder which thoroughly incorporates the solute into the product.

Although the supercritical fluid density is reduced upon injection into the product, the solubility of the fluid in the aqueous phase of the extruder product is still significant due to high pressure in the extruder, and accordingly, the supercritical fluid which remains in the product after mixing can be used to control the final product density by expansion, or puffing, of the product as it exits the extruder die. The extent of puffing and the addition of solutes are controlled by the amount of SCF introduced into the extruder. The supercritical fluid can be partially or fully vented before the product exits the extruder so that the expansion of the product leaving the extrusion die is controlled, or if desired is not expanded at all. In addition, the solubility of the SCF is utilized in performing controlled hydrolysis of the extrudate to obtain different characteristics in the end product.

The process of the present invention has several advantages over the traditional extrusion cooking process. For example, the use of a supercritical fluid such as $CO_2$ allows for simultaneous expansion, flavoring, and reduction of viscosity. Further, foams with different textural and mechanical properties can be produced by independently varying the mechanical energy input to the product and thus varying the starch degradation and or protein denaturation, in the cooking zone, by venting the extruder if necessary, and then by controlling the density (or the degree of expansion) of the extruded product by varying the flow of supercritical fluids into the cooled extruder product. If the product in the extruder is less than 100° C., then puffing due to the conversion of water to steam is prevented, and all expansion of the product upon extrusion will be due to the presence of the supercritical fluid.

The expansion, or puffing process, provided by supercritical fluids such as $CO_2$ is much less explosive than the puffing that results from the conversion of water into steam, which is the conventional process. Accordingly, the supercritical fluid expansion produces a product with a smooth outer surface and uniform regularly-shaped, unconnected internal pores.

A further advantage to the present invention is that flavoring, coloring, nutrients, and the like added by way of the supercritical fluids are dissolved into the water phase of the product and thus are incorporated directly into the product before it reaches the extrusion die, so that post-extrusion flavoring operations and the like can be eliminated. The incorporation of heat sensitive flavoring materials just before the exit die by including them in the supercritical fluid minimizes the loss of such materials due to heat. Also, a supercritical fluid such as $CO_2$, when used for product expansion, reduces the viscosity of the product in the extruder so that the pressure at the exit die is significantly reduced. As a result, throughput can be increased at a lower moisture content, without exceeding the motor torque or die pressure limitations of the extruder. The reduction in product viscosity can also lead to a lower energy requirement for operation of the extruder.

Also, a supercritical fluid such as $CO_2$ can be used to adjust the pH of the product in the extruder, and therefore products with the characteristics of acid modified starches can be produced. This permits the production of industrial products utilizing the general concept of the present invention to add color and to control the functional and rheological characteristics of the extrudate.

BRIEF DESCRIPTION OF THE DRAWINGS

The foregoing, and additional objects, features and advantages of the present invention will be more clearly understood by those of skill in the art from a consideration of the following detailed description of a preferred embodiment, taken in conjunction with the accompanying drawing which illustrates, in diagrammatic form, apparatus for carrying out the extrusion process of the invention.

DESCRIPTION OF PREFERRED EMBODIMENT

The present invention, as illustrated in the drawing is directed to a process for producing a food product through an extrusion process, and to apparatus for carrying out the process. Although the invention will be described in terms of a light, crisp, expanded, wafer-like product, it will be apparent that products with a wide range of flavors, textures and appearance can be produced in accordance with the invention. A product produced in accordance with the herein-described embodiment of the invention more closely resembled a bread stick in texture, taste and appearance than a traditional expanded corn curl, but incorporated an abundance of uniform, small air cells that gave it a unique texture and taste. The unique features of this product are due to the less severe cooking and shear conditions, which affect the degree of starch modification of the product and puffing with SC-$CO_2$. The process of the present invention is suitable for the production of products such as low-fat baked snacks and wafers suitable for dipping in chocolate and other coating materials. The exact characteristics of the product can be controlled by varying the processing conditions and the formulation of the dough from which the product is formed, not only in the manner available with prior extrusion processes, but further in accordance with the conditions provided by the present invention.

As illustrated in the FIGURE, flour such as corn meal, is supplied from a hopper 10 through a suitable outlet 12 to a mixer 14 where it is preconditioned with steam or water added to inlet 16 to form a dough. The flows of steam and water are adjusted until the dough leaving the preconditioning mixer 14 by way of outlet 18 is at about 65° to 71° C. (150° to 160° F.), or just able to form a crumbly dough ball. The preconditioned dough is supplied through outlet 18 to a conventional extruder 20 which may be, for example, a Wenger TX52 twin-screw extruder, illustrated in diagrammatic form in the FIGURE. The extruder 20 includes a pair of conveying screws such as screw 22 carried on shaft 24 which extends longitudinally through the barrel 26 of the extruder. The extruder screw 22 is configured in conventional manner and includes a series of forward kneading discs, conveying screws and reverse kneading discs in a cooking section generally indicated at 30.

After the dough has been transferred into the extruder 20, additional water may be injected through the extruder barrel at inlet 32 in an amount sufficient to achieve a dough moisture content of 20% to 35% by weight of the dough. The dough is conveyed through the cooking section 30 of the extruder by rotation of the extrusion screws 22, in conventional manner, the kneading discs and conveying screws being configured to produce a residence time for the dough in the cooking section sufficient to heat the dough to about 100° C. to 120° C. (212° F. to 248° F.). During this heating, or cooking process, the starch in the dough is gelatinized so that a viscoelastic "melt" is formed that will expand upon exiting the die, as will be explained below.

In one form of the invention, the dough is heated in the cooking section 30 by the addition of steam injected, for example, at inlet 32. In a preferred form of the invention, an optional steam vent 34 is provided after the cooking section 30 to allow excess steam to escape and to thereby lower the pressure in this region of the extruder 20. The vent may be isolated in the extruder 20 by means of a reverse pitch screw element (not shown) which combines with the vent head 34 to produce a low pressure zone 36 in the extruder 20. In this zone, the dough temperature is instantly lowered, as is its moisture content. If desired, vacuum can be applied to the vent outlet to further increase its efficiency and to assist in reducing the moisture content.

To further reduce the dough temperature in the extruder 20, and to maintain that temperature at less than 100° C., cooling with a suitable circulating liquid is provided in the cooling section 40 following the vent head 34. A cooling chamber such as that diagrammatically illustrated at 42, or other suitable cooling structure may be provided in conventional manner. In addition, the profile of the extruder screw in the cooling section 40 is selected so as to minimize heating by viscous dissipation as the dough is conveyed along the length of shaft 24.

At a location spaced from the exit end 44 of the extruder and downstream from the steam vent 34 is an inlet 46 through which a supercritical fluid can be injected into a SCF mixing section 48 in the extruder 20, and thus into the dough being conveyed therethrough. As described above, in a preferred form of the invention the supercritical fluid is carbon dioxide at a temperature and pressure which causes it to be in a transition state between its liquid and gas phases. The supercritical fluid, preferably also contains soluble additives, such as flavoring additives, nutrients, colorants or the like, which are to be injected into and mixed with the dough.

As illustrated in the FIGURE, a supercritical fluid extraction unit 50 supplies fluid from a conventional $CO_2$ gas cylinder 51 through a high pressure line 52 incorporating a pair of check valves 54 and suitable flow control valves 56, 58 and 60 to an extraction vessel 62, where selected additives to the supercritical fluid are provided. The additive may be in the form of a liquid 64 through which the $CO_2$ is bubbled, whereby the additive is dissolved in the $CO_2$. The $CO_2$ and the solute additive are removed from the extraction vessel 62 by way of high pressure output line 66 which includes metering valve 68 and a back pressure regulator 70, the line 66 supplying the $CO_2$ and its additive solute by way of inlet 46 to the product contained in the extruder 20.

In one form of the invention, the supercritical fluid supply line 52 is connected by way of a bypass line 72 through a pump 74 and valve 76 to a cooling bath 78, and is then fed by way of line 80 from the cooling bath back to the high pressure line 52. This recirculating cooling loop is generally indicated at 82 and serves to regulate the temperature of the supercritical fluid.

A purge line 84 may be connected to the outlet line 66 to release pressure from the outlet line 66 by way of a heating coil 86, an extractor 88 for removing solids from the supercritical fluid, and an outlet vent 88 for venting excess gas to the atmosphere.

As described above, the supercritical fluid and its solutes which are injected at inlet 46 are injected into the dough contained in extruder 20 under relatively high pressure. The conveyor screws in the cooling section 40 utilize small pitch screws to convey the dough toward outlet end 44 to prevent the injected supercritical fluid from flowing upstream toward the steam vent 34. The feed rate of the dough and the screw speed are selected to provide sufficient fill in the conveyor to prevent such a backflow, and to produce sufficient fill downstream of the injection inlet 46 is also sufficient to insure that two-phase flow is eliminated; i.e., to provide pressure in the conveyor sufficient to prevent the supercritical fluid from escaping as a gas through the outlet die 90 formed in the end 44 of the extruder. In this way, the supercritical fluid cannot escape from the extruder, and thus is dissolved into the dough.

The conditions of the supercritical fluid are controlled by the supercritical fluid extraction unit 50 described above, through the use of appropriate instrumentation to control the pressure and flow rates. In particular, the pressure in the extraction vessel 64 and the pressure at which the fluid is injected into the extruder at inlet 46 are controlled by suitable metering valves and pressure regulators, as discussed above. Since the $CO_2$ supercritical fluid tends to decrease the viscosity of the dough in extruder 20, which will tend to permit a faster flow of the dough through the exit die 90 and thus may tend to decrease the amount of the extruder which is filled with dough, the die 90 is provided with an adjustable open area. The size of the die opening then is controlled to regulate the head pressure at the end 44 of the extruder, to thereby control the filled section of the extruder. Furthermore, by controlling the head pressure the degree of expansion of the extrudate can also be controlled, with greater expansion of the dough being obtained at lower head pressures, and lesser expansion being obtained as the head pressure is increased.

After the food product leaves the extruder die 90, it may be treated, as by baking or toasting to develop flavor and reduce the moisture content to less than 10% to thereby provide a crisp texture during storage in air tight packages. Alternatively, the extruded product can be fried to develop other colors, flavors and textures, and can also be coated or dipped in other ingredients. It has been found that the use of a supercritical fluid such as $CO_2$ results in the formation of carbonic acid by reason of the solubility of $CO_2$ in the water of the dough, and this is further utilized to hydrolyze the starch to enhance sweetness and/or to control the functional properties of the extrudate. Thus, supercritical $CO_2$ can be injected without additives for the purpose of starch modification prior to puffing.

EXAMPLE

Corn meal (10% moisture W.B.) was fed into a preconditioner attached to a Wenger TX52 twin-screw extruder in a 14-head configuration. The feed rate was 150 lbs. per hour. Steam was added to the preconditioner at the rate of 0.5 lbs per minute and water at the rate of 0.35 lbs per minute. Steam and water were added to the dough in the cooking section, also at 0.35 lbs per minute. The steam fed into the cooking section was adjusted so that the dough temperature before the steam vent was about 120° C. Barrel temperatures in the 14 head configuration of the extruder were as follows:

No. 1 through No. 4 were at ambient temperature;
Nos. 5 and 6 were at 110° C. (230° F.);
No. 7 was at the vent head ambient temperature; and
Nos. 8 to 14 were cooled with chilled water at about 4° C. (39.2° F.).

The screw speed was maintained at 200 rpm.

The extruder screw configuration consisted of conveying screws followed by a series of forwarding kneading discs, conveying screws and reverse kneading discs, up to the steam vent, which was isolated with a reverse pitch element. After the steam vent head, conveying screws were used to transport the cooked viscoelastic dough toward the exit die. Supercritical $CO_2$ with dissolved milk fat (1.5% by weight) was injected through head No. 10 of the extruder into a partially filled SCF mixing section. The pressure at this location increased from 0 to 300 psi (2.1 MPa) as the amount of $CO_2$ was regulated into the system. Small pitch conveying screws and discs were used to prevent the $CO_2$ from backing out of the steam vent. The feed rate and screw speed combination was selected to provide a degree of fill behind the exit die sufficient to prevent 2-phase flow. After the process steadied, the adjustable area die was used to vary the head pressure behind the die from about 270 psi (1.8 MPa) to 800 psi (5.5 MPa). Greater expansion of the product was obtained at the lower head pressure, and expansion decreased as the head pressure increased. Although some loss of expansion was observed upon cooling immediately after extrusion, the extrudates were all expanded sufficiently to produce a light, aerated, wafer-like product which contained milk fat. These products were then baked at 177° C. (350° F.) to impart color and flavor and to set the porous structure by heating above the extrusion temperature. The baking process also lowered the moisture content sufficiently for maintaining quality during storage. The products had a unique texture and faint sweetness, that had not been observed with conventionally extruded puffed products. The products were consumed as is like a bread stick snack, but could also have been fried or otherwise dipped in chocolate or other coatings. Additionally, other flavorings could be added to the product by first dissolving such additives in the supercritical $CO_2$.

Although the present invention has been described in terms of a preferred embodiment, it will be apparent that numerous modifications and variations may be made without departing from the true spirit and scope thereof as set forth in the following claims:

What is claimed is:

1. Apparatus for extrusion processing of food products, comprising:
   means forming a dough for a food product;
   extruder means having a cooking section, a cooling section, a mixing section, and an extrusion die;

means supplying said dough to said extruder;

means conveying said dough sequentially through said cooking section, cooling section and mixing section to said extrusion die; and means supplying a supercritical fluid to said extruder in the region of said mixing section.

2. The apparatus of claim 1, wherein said means conveying said dough and said extrusion die are selected to provide sufficient pressure in said dough to prevent backflow of said supercritical fluid and to minimize two-phase flow of said fluid, whereby said supercritical fluid through said die dissolves in said dough.

3. The apparatus of claim 2, further including means to regulate the pressure of said supercritical fluid.

4. The apparatus of claim 3, further including means for dissolving additives in said supercritical fluid, whereby said additives are supplied to said dough in said mixing section with said supercritical fluid.

5. The apparatus of claim 1, wherein said means supplying supercritical fluid to said extruder includes a supercritical fluid extraction unit having a source of $CO_2$ under pressure and an inlet to said extruder in the region of said mixing section, whereby $CO_2$ is injected into said extruder.

6. The apparatus of claim 1, wherein said extraction unit includes an extraction vessel for supplying additives to said $CO_2$ prior to supplying said $CO_2$ to said mixing region.

7. The apparatus of claim 6, wherein said extraction unit includes pressure control means for regulating the pressure at which said $CO_2$ is injected into said extruder.

8. The apparatus of claim 7, wherein said extruder includes a vent between said cooking section and said cooling section to create a low pressure zone to reduce the temperature and moisture content of said dough.

9. The apparatus of claim 8, wherein said means conveying said dough, said extrusion die and the pressure of said supercritical fluid are selected to provide sufficient pressure in said dough to dissolve at least a part of said supercritical fluid in said dough.

10. The apparatus of claim 9, wherein said dough is extruded from said mixing section through said die, said dissolved $CO_2$ being released after extrusion to expand said dough.

11. The method of extrusion processing a food product, comprising:

supplying a dough to an extruder having cooking, cooling and mixing sections;

conveying said dough through said cooking section to cook said dough;

cooling said cooked dough in said cooling section;

conveying said dough to a mixing section;

injecting a supercritical fluid into said dough in said mixing section at a temperature and pressure which will dissolve said supercritical fluid and any additives therein into said dough;

conveying said dough through an extrusion die; and expanding said dough by the release of said supercritical fluid.

12. The method of claim 11, wherein said step of cooling includes cooling said dough to a temperature of less than 100° C., whereby expansion of said dough is due solely to the release of said supercritical fluid.

13. The method of claim 12, further including preconditioning said dough prior to supplying it to said extruder to control the moisture of said dough.

14. The method of claim 13, further including cooking said dough in said cooking section through the injection of steam into said cooking section.

15. The method of claim 14, wherein the step of cooling said cooked dough includes venting said steam to reduce the temperature of said dough below 100° C.

16. The method of claim 15, wherein the step of injecting a supercritical fluid into said dough includes injecting $CO_2$ at a supercritical temperature and pressure, whereby said $CO_2$ dissolves into said dough in said mixing section.

17. The method of claim 16, wherein the step of injecting said supercritical fluid includes conditioning said supercritical fluid in an extractor unit to dissolve additives in said fluid for transfer to said dough.

18. The apparatus of claim 1, wherein said means supplying a supercritical fluid to said extruder injects said fluid at a temperature and pressure sufficient to cause said fluid to be dissolved in said dough.

19. The apparatus of claim 18, wherein said supercritical fluid is carbon dioxide at a temperature and pressure which causes it to be in a transition state between liquid and gas phases.

20. The apparatus of claim 18, further including vent means adjacent said extrusion die for releasing supercritical fluid not dissolved in said dough.

21. The method of claim 11, further including venting undissolved supercritical fluid from said extruder prior to conveyance of said dough through said extrusion die.

22. The method of claim 21, wherein the step of conveying said dough is carried out at a pressure sufficient to prevent backflow of said supercritical fluid.

23. The method of claim 22, wherein the step of conveying said dough is further carried out at a pressure sufficient to prevent the escape of said supercritical fluid as a gas through the extrusion die, whereby the supercritical fluid dissolved in the dough is released as the dough is extruded through the extrusion die to expand the dough.

* * * * *